United States Patent
Li

(10) Patent No.: US 12,149,476 B2
(45) Date of Patent: Nov. 19, 2024

(54) METHOD FOR SENDING BEAM FAILURE REQUEST, AND ELECTRONIC DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 353 days.

(21) Appl. No.: 17/762,711

(22) PCT Filed: Sep. 29, 2019

(86) PCT No.: PCT/CN2019/109116
§ 371 (c)(1),
(2) Date: Mar. 22, 2022

(87) PCT Pub. No.: WO2021/056550
PCT Pub. Date: Apr. 1, 2021

(65) Prior Publication Data
US 2022/0337375 A1   Oct. 20, 2022

(51) Int. Cl.
*H04L 5/00* (2006.01)
*H04W 72/54* (2023.01)

(52) U.S. Cl.
CPC ........... *H04L 5/0053* (2013.01); *H04W 72/54* (2023.01)

(58) Field of Classification Search
None
See application file for complete search history.

(56) References Cited

U.S. PATENT DOCUMENTS

| | | | |
|---|---|---|---|
| 2018/0324872 A1 | 11/2018 | Babaei et al. | |
| 2019/0052343 A1 | 2/2019 | Li et al. | |
| 2019/0053314 A1 | 2/2019 | Zhou et al. | |
| 2019/0149365 A1* | 5/2019 | Chatterjee | H04L 25/0226 370/329 |
| 2019/0215820 A1 | 7/2019 | Cirik et al. | |
| 2019/0254064 A1 | 8/2019 | Islam et al. | |
| 2020/0120682 A1 | 4/2020 | Li et al. | |
| 2022/0124784 A1* | 4/2022 | Kang | H04B 7/0695 |

(Continued)

FOREIGN PATENT DOCUMENTS

| | | |
|---|---|---|
| CN | 109150424 A | 1/2019 |
| CN | 110149177 A | 8/2019 |
| WO | 2018230862 A1 | 12/2018 |

OTHER PUBLICATIONS

Extended European Search Report issued in Application No. 19947115. 2, dated Apr. 20, 2023,(12p).

(Continued)

*Primary Examiner* — Clemence S Han
(74) *Attorney, Agent, or Firm* — Arch & Lake LLP

(57) ABSTRACT

A method for sending a beam failure request and an electronic device are provided. The method includes: determining a first resource for sending a beam failure request in a physical uplink control channel (PUCCH) in response to a beam failure occurring in a secondary cell of a server cell; determining whether a second resource occupied by another signaling to be sent through the PUCCH is overlapped with the first resource; and sending the beam failure request at least on the first resource in response to determining that the second resource is overlapped with the first resource.

18 Claims, 5 Drawing Sheets determining a first resource for sending a beam failure request in a physical uplink control channel (PUCCH) in response to a beam failure occurring in a secondary cell of a server cell — S1 determining whether a second resource occupied by another signaling to be sent through the PUCCH is overlapped with the first resource — S2 sending the beam failure request at least on the first resource in response to determining that the second resource is overlapped with the first resource — S3

(56) References Cited

U.S. PATENT DOCUMENTS

2022/0158794 A1* 5/2022 Zhang .................. H04L 5/0051
2022/0311498 A1* 9/2022 Loehr .................... H04B 7/088
2022/0416870 A1* 12/2022 Ling ................ H04W 72/1268

OTHER PUBLICATIONS

LG Electronics, "Discussion on multi-beam based operations and enhancements" 3GPP TSG RAN WG1 Meeting #98, R1-1908700, Prague, CZ, Aug. 26-30, 2019, (13p).
NEC, "Discussion on multi-beam operation", 3GPP TSG RAN WG1 #96bis, R1-1904664, Xian, China, Apr. 8-12, 2019, (3p).
VIVO, "Further discussion on Multi-Beam Operation", 3GPP Tsg Ran WG1 #98, R1-1908167, Prague, CZ, Aug. 26-30, 2019, (12p).
International Search Report of PCT Application No. PCT/CN2019/109116 dated Jun. 23, 2020 with English translation, (6p).
Huawei et al., "Remaining Issues for SRS Switching Among CCs", 3GPP TSG RAN WG1 Meeting #93, R1-1807134, May 25, 2018, (4p).
Mitsubishi Electric, "Views on SRS Designs", 3GPP TSG RAN WG1 #90b, R1-1718467, Oct. 13, 2017, (13p).
First Office Action of Indian Application No. 202247024934 dated Aug. 29, 2022 with partial English translation, (5p).

\* cited by examiner

METHOD FOR SENDING BEAM FAILURE REQUEST, AND ELECTRONIC DEVICE

CROSS-REFERENCE TO RELATED APPLICATION

This application is a U.S. National Stage of International Application No. PCT/CN2019/109116, filed on Sep. 29, 2019, the entire content of which is incorporated herein by reference for all purposes.

TECHNICAL FIELD

The disclosure relates to a field of communication technologies, and particularly to a method for sending a beam failure request, and an electronic device.

BACKGROUND

In the related art, when a user device detects that a beam failure (BF) occurs in a secondary cell (SCell), beam failure information can be reported.

The beam failure information can be reported mainly through two steps.

Firstly, a beam failure request (BFR) is sent on a physical uplink control channel (PUCCH) to request a physical uplink shared channel (PUSCH) resource, and then the beam failure information is sent on the requested PUSCH resource.

Since the BFR is transmitted on the PUCCH, there may be a collision with another signaling transmitted on the PUCCH.

SUMMARY

According to a first aspect of the disclosure, a method a beam failure request is provided. The method is performed by a terminal and includes: determining a first resource for sending a beam failure request in a physical uplink control channel (PUCCH) in response to a beam failure occurring in a secondary cell of a server cell; determining whether a second resource occupied by another signaling to be sent through the PUCCH is overlapped with the first resource; and sending the beam failure request at least on the first resource in response to determining that the second resource is overlapped with the first resource.

According to a second aspect of the disclosure, an electronic device is provided. The electronic device includes: a processor; and a memory storing instructions executable by the processor. The processor is configured to perform the method according to any of the above embodiments of the disclosure.

According to a third aspect of the embodiments of the disclosure, there is provided a non-transitory computer-readable storage medium stored with executable instructions thereon. The executable instructions are loaded and executed by a processor in a terminal, to perform a method for sending a beam failure request according to any of the above embodiments of the disclosure.

BRIEF DESCRIPTION OF THE DRAWINGS

In order to illustrate the technical solutions in the embodiments of the disclosure more clearly, the accompanying drawings for describing the embodiments will be briefly introduced below. Obviously, the accompanying drawings in the following description are only some embodiments of the disclosure, and persons of ordinary skill in the art may obtain other drawings according to the accompanying drawings without making creative efforts.

DETAILED DESCRIPTION

Figure 1:
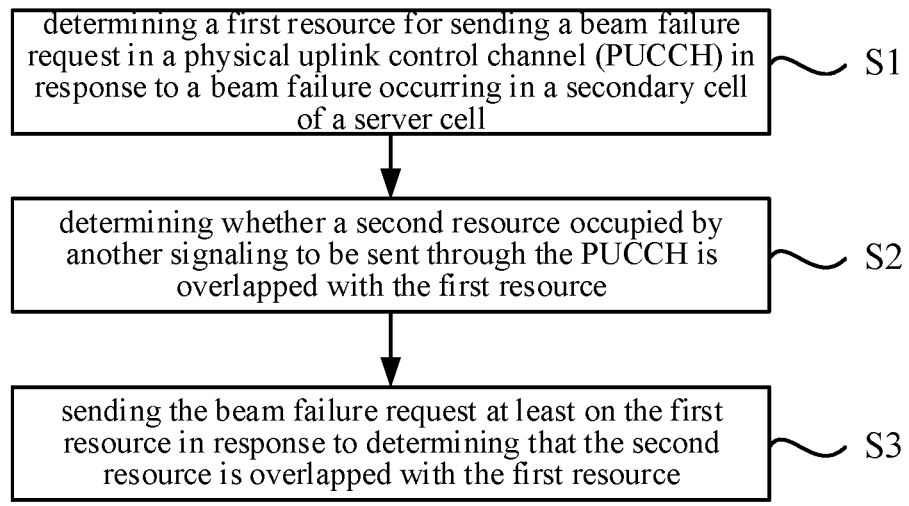
FIG. 1 is a flowchart illustrating a method for sending a beam failure request according to an embodiment.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a flowchart illustrating a method for sending a beam failure request according to an embodiment. The method for sending a beam failure request described in this embodiment may be applied in a terminal. The terminal may be used as a user device to communicate with a base station, for example based on a 4G long term evolution (4G LTE) technology or based on a 5G new radio (5G NR) technology. The terminal includes but is not limited to a mobile phone, a tablet, a wearable device, a vehicle-mounted device or other electronic devices.

As illustrated in FIG. 1, the method for sending a beam failure request may include the following.

At block S1, in response to a beam failure occurring in a secondary cell of a server cell, a first resource for sending the beam failure request in a physical uplink control channel (PUCCH) is determined.

In an embodiment, the terminal may detect the secondary cell of the server cell, for example detecting predefined resources of reference signals (RSs), if a detection result indicates that a signal strength of each predefined RS (such as reference signal receiving power, RSPP for short) is less than a first predetermined threshold, it may be determined that the beam failure occurs in the secondary cell.

Further, a signal strength of a reference signal on a candidate beam configured by the base station may be detected. If the signal strength of the reference signal on a certain candidate beam is greater than a second predetermined threshold, the candidate beam can be considered as a new suitable beam.

At block S2, it is determined whether a second resource occupied by another signaling to be sent through the PUCCH is overlapped with the first resource.

At block S3, the beam failure request is sent at least on the first resource in response to determining that the second resource is overlapped with the first resource.

In an embodiment, when the beam failure occurs in the secondary cell, different from a situation that the beam failure occurs in a main cell of the server cell (a random access needs to be initiated if the beam failure occurs in the main cell), the terminal may send the beam failure request to the base station on the PUCCH (for example, the PUCCH of any server cell configured with the PUCCH resource). Since there may be another signaling to be sent to the base station on the PUCCH, there may be a situation that the first resource (time-frequency resource) for sending the beam failure request is overlapped with the second resource (time-frequency resource) for sending the another signaling (in the time domain and frequency domain).

The expression "overlapped with" may refer to "partly overlapped with" or "completely overlapped with". The another signaling includes but is not limited to a scheduling request (SR), channel state information (CSI), a hybrid automatic repeat request (HARM).

In the embodiment, in the case that the second resource for sending the another signaling is overlapped with the first resource for sending the beam failure request, the beam failure request may be sent at least on the first resource, so as to ensure that the base station may allocate the PUSCH resource to the terminal for sending beam failure information, such that a beam failure recovery may be realized.

Since an influence of the beam failure on a communication quality of the terminal is higher than an influence of the delayed transmission of the another signaling on the communication quality, the embodiment of the disclosure may ensure that the beam failure request is sent preferentially, and further ensure that the beam failure recovery is completed as soon as possible, which facilitates realizing a better communication quality of the terminal.

It should be noted that, after receiving the beam failure request, the base station may allocated the PUSCH resource to the terminal. The terminal may send the beam failure information to the base station on the requested PUSCH resource. The beam failure information may be sent to the base station in format of a medium access control element (MAC CE). The beam failure information may include an index of the secondary cell in which the beam failure occurs, and may further include an index of a new suitable beam if the new suitable beam is detected.

Alternatively, the another signaling may be the scheduling request. The beam failure request may have a same indication format as the scheduling request.

In an embodiment, a bit indication codeword may be sued to indicate contents to be transmitted in the overlapped resource. In the case that the another signaling is the scheduling request, the indication format of the beam failure request may be the same as the indication format of the scheduling request.

A bit number of bits occupied by the scheduling request is 0, i.e., no bit is occupied. The terminal may generate energy merely on a certain PUCCH time-frequency resource. When the base station detects the energy on the PUCCH time-frequency resource, corresponding content on the PUCCH time-frequency resource is determined as the scheduling request.

Since the indication format of the beam failure request is the same as the indication format of the scheduling request, a bit number of bits occupied by the beam failure request is also 0. When the beam failure request is sent, energy may be generated on a certain PUCCH time-frequency resource. When the base station detects the energy on the PUCCH time-frequency resource, a PUSCH resource may be configured for the terminal.

In the embodiment, the beam failure request and the scheduling request use the same PUCCH time-frequency resource and the same indication format, i.e., the certain energy is sent on the corresponding PUCCH time-frequency resource to indicate that the PUSCH resource is requested. If the base station detects the energy on the corresponding PUCCH resource, the base station is unaware of whether the terminal requests for the PUSCH resource due to the beam failure or due to a requirement of sending uplink data.

After the PUSCH resource is requested, the terminal may send the beam failure request on the requested PUSCH resource. If the terminal further has uplink data to be sent through the PUSCH, and the requested PUSCH resource is big enough to carry the uplink data and the beam failure request, the beam failure request and the uplink data may be sent to the base station on the requested PUSCH resource. In other words, in the embodiment, a transmission priority of the beam failure information is higher than a transmission priority of the uplink data.

Figure 2:
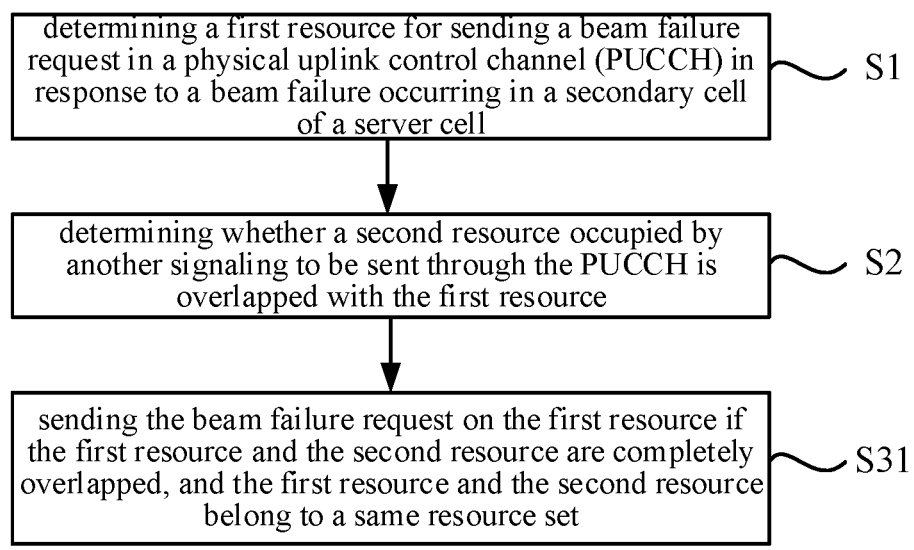
FIG. 2 is a flowchart illustrating a method for sending a beam failure request according to another embodiment.

FIG. 2 is a flowchart illustrating a method for sending a beam failure request according to another embodiment. As illustrated in FIG. 2, the first resource is completely overlapped with the second resource. The first resource and the second resource belong to a same resource set. The beam failure request is sent at least on the first resource by the following steps.

At block S31, the beam failure request is sent on the first resource.

In an embodiment, in the case that the indication format of the beam failure request is the same as the indication format of the scheduling request, if the first resource is completely overlapped with the second resource, and the first resource and the second resource belong to the same resource set, when the base station detects the energy on the PUCCH time-frequency resource, since the beam failure request and the scheduling request have the same indication format, the base station cannot determine whether the energy on the corresponding resource indicates the beam failure request or the scheduling request.

In order to ensure that the base station can configure the PUSCH resource for the terminal, a certain energy can be sent on the first resource (a power for generating the energy may be set according to actual needs) regardless of whether the beam failure request or the scheduling request is indicated, so as to send the beam failure information on the requested PUSCH resource. In order to simplify a processing logic of the terminal, in this case, the energy sent on the first resource can be considered as the beam failure request.

Alternatively, the method may further include:
sending the beam failure request on the first resource and the scheduling request on the second resource in response to determining that the first resource is not overlapped with the second resource.

In an embodiment, in the case that the indication format of the beam failure request is the same as the indication format of the scheduling request, if the detection result indicates that the first resource is not overlapped with the second resource, which means that sending the scheduling request on the second resource has no influence on sending the beam failure request on the first resource, then the beam failure request can be sent on the first resource and the scheduling request can be sent on the second resource, such that both the beam failure request and the scheduling request can be sent to the base station, and the base station may configure a suitable PUSCH resource for the beam failure request and the scheduling request. In the embodiment, the base station configures separate PUCCH time-frequency resource respectively for the beam failure request and the scheduling request. In this way, the base station may know which energy indicates the beam failure request and which energy indicates the scheduling request based on the positions of the PUCCH resources.

Alternatively, the another signaling is the scheduling request. The beam failure request and the scheduling request occupy a same bit, and a bit indication codeword of the beam failure request is different from a bit indication codeword of the scheduling request.

In an embodiment, when the beam failure request and the scheduling request occupy the same bit, different bit indication codewords may be used to indicate whether the beam failure request or the scheduling request is transmitted in the overlapped resource, so that the base station may explicitly determine whether the beam failure request or the scheduling request is transmitted in the overlapped resource based on the bit indication codeword.

For example, the beam failure request and the scheduling request occupy two same bits. The two bits are used to identify the beam failure request through "10" and identify the scheduling request through "01". The base station may determine that the beam failure request is transmitted in the overlapped resource (so as to determine that a beam failure occurs in a secondary cell) when the bit indication codeword is "10", and may determine that the scheduling request is transmitted in the overlapped resource (so as to determine that the terminal has uplink data to be sent) when the bit indication codeword is "01".

In this case, since two bits may identify four states, in addition to indicating that the beam failure request is transmitted in the overlapped resource or indicating that the scheduling request is transmitted in the overlapped resource, the two bits may further indicate that both the beam failure request and the scheduling request are transmitted in the overlapped resource. For example, the two bits are used to indicate that both the beam failure request and the scheduling request are transmitted in the overlapped resource through "11", and the beam failure request and the scheduling request are sent on the overlapped resource based on multiplexing.

For another example, the beam failure request and the scheduling request occupy one same bit. The one bit is used to identify the beam failure request through "1" and identify the scheduling request through "0". The base station may determine that the beam failure request is transmitted in the overlapped resource (so as to determine that a beam failure occurs in a secondary cell) when the bit indication codeword is "1", and may determine that the scheduling request is transmitted in the overlapped resource (so as to determine that the terminal has uplink data to be sent) when the bit indication codeword is "0".

Figure 3:
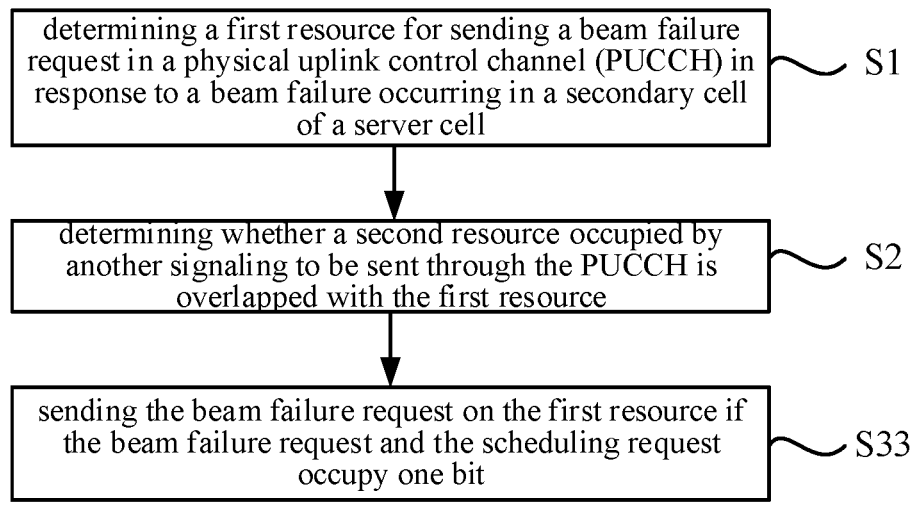
FIG. 3 is a flowchart illustrating a method for sending a beam failure request according to another embodiment.

FIG. 3 is a flowchart illustrating a method for sending a beam failure request according to another embodiment. As illustrated in FIG. 3, the beam failure request and the scheduling request occupy one bit. The beam failure request is sent at least on the first resource by the following steps.

At block S33, the beam failure request is sent on the first resource.

In an embodiment, in the case that the beam failure request and the scheduling request occupy the same bit while the bit indication codeword of the beam failure request is different from the bit indication codeword of the another signaling (the scheduling request), if the beam failure request and the scheduling request occupy one same bit, the one bit may only identify two states, for example "1" is used to identify the beam failure request and "0" is used to identify the scheduling request. When the second resource is overlapped with the first resource, since one bit cannot identify both the beam failure request and the scheduling request, but only can identify the beam failure request or the scheduling request, only the beam failure request is sent on the first resource. By using the one bit to identify the beam failure request, it may ensure that the base station may receive the beam failure request and may determine that the content in the received resource is the beam failure request based on the bit indication codeword.

Figure 4:
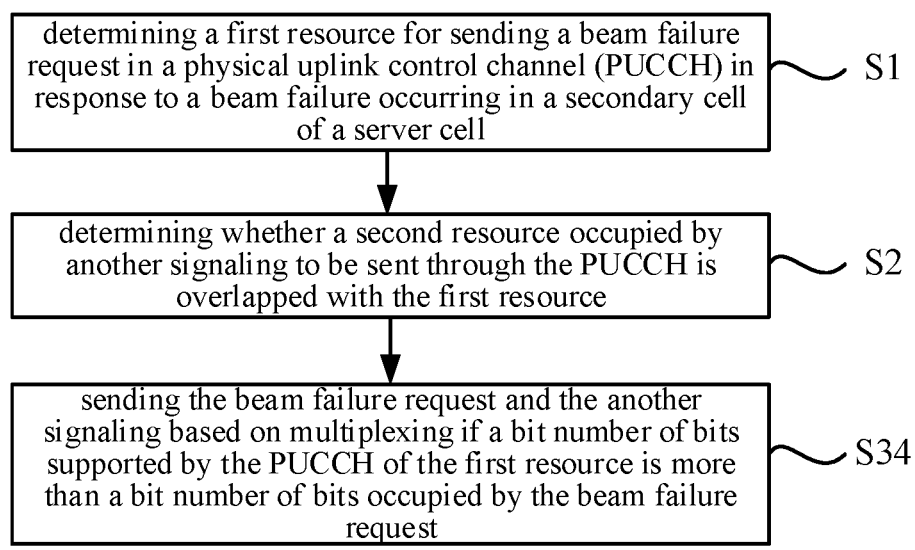
FIG. 4 is a flowchart illustrating a method for sending a beam failure request according to another embodiment.

FIG. 4 is a flowchart illustrating a method for sending a beam failure request according to another embodiment. As illustrated in FIG. 4, a bit number of bits supported by the PUCCH of the first resource is more than a bit number of bits occupied by the beam failure request. The beam failure request is sent at least on the first resource by the following steps.

At block S34, the beam failure request and the another signaling are sent based on multiplexing.

In an embodiment, in the case that the beam failure request and the another signaling occupy different bits, if the bit number of bits supported by the PUCCH of the first resource is more than the bit number of bits occupied by the beam failure request, for example, the PUCCH supports five bits while the beam failure request occupies two bits, there are three remaining bits on the PUCCH which can be used to identify the another signaling, such that the terminal may send the beam failure request and the another signaling on the overlapped resource. A specific sending way may be sending the beam failure request and the another signaling based on multiplexing. The another signaling includes but is not limited to a scheduling request, channel state information fed back to the base station and a hybrid automatic repeat request.

The base station may determine whether the terminal sends the beam failure request bases on the bits corresponding to the beam failure request in the PUCCH, and may determine whether the terminal sends the another signaling based on the bits corresponding to the another signaling in the PUCCH.

Alternatively, the beam failure request occupies a plurality of bits, and the bit indication codeword of the plurality of bits of the beam failure request is configured to at least indicate:

the secondary cell in which the beam failure occurs.

In an embodiment, the bit indication codeword of the plurality of bits is configured to at least indicate the secondary cell in which the beam failure occurs, so that when the terminal sends the beam failure request to the base station, the base station may determine that the beam failure request is carried in the first resource based on the bit indication codeword, and then configures the PUSCH resource for the terminal.

Alternatively, the bit indication codeword of the plurality of bits of the beam failure request is further configured to indicate at least one of:

a number of secondary cells in which the beam failure occurs;

having uplink data to be sent; and a data amount of the uplink data to be sent.

In an embodiment, in addition to indicating the secondary cell in which the beam failure occurs, the bit indication codeword of the plurality of bits may further indicate other information, such as the number of the secondary cells in which the beam failure occurs, and may further indicate having uplink data to be sent when the another signaling is the scheduling request, and the data amount of the uplink data to be sent. In this way, the base station may accurately determine a specific situation of the beam failure, and may further determine a specific situation of the terminal having the uplink data to be sent, so that the base station may configure a suitable PUSCH resource for the terminal.

It should be noted that, the above information indicated by the bit indication codeword is merely one embodiment of the disclosure, and the information indicated by the bit indication codeword may be set according to needs.

For example, the bit indication codeword of two bits identifies the scheduling request through "00", which means that the terminal has uplink data to be sent, indicates that the beam failure occurs in one secondary cell through "01", indicates that the beam failure occurs in multiple secondary cells through "10", and indicates that the beam failure occurs in the secondary cell and that the terminal has uplink data to be sent through "11". There may be other mapping relationships between the bit indication codewords and the indicated information, which are not elaborated here.

The bit indication codeword may be further set to identify the scheduling request and a large amount of data, identify the scheduling request and a small amount of data according to needs. Or the bit indication codeword may be reserved, i.e., not identifying any information but used for future.

Figure 5:
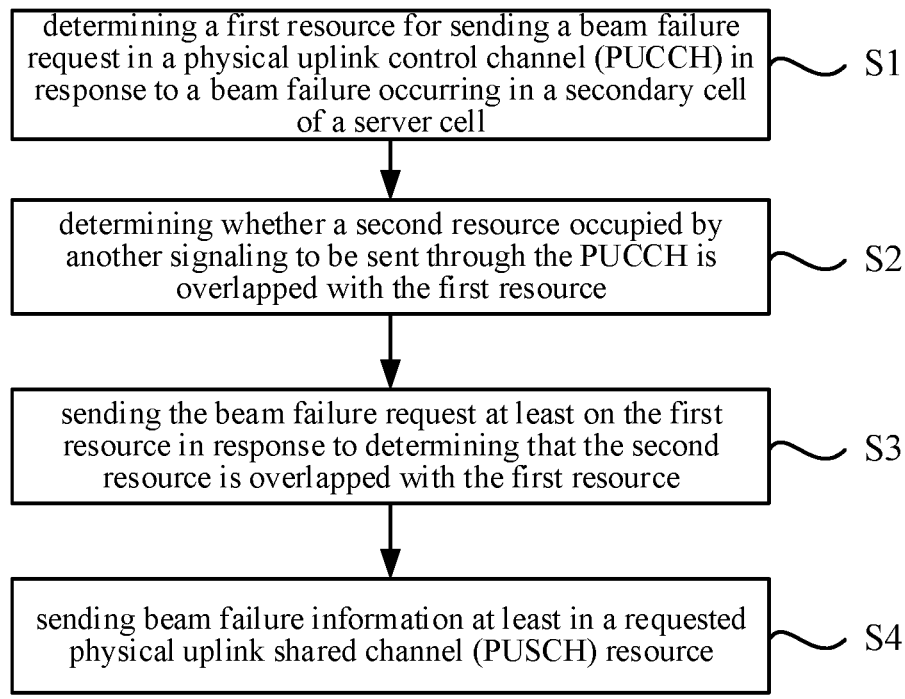
FIG. 5 is a flowchart illustrating a method for sending a beam failure request according to another embodiment.

FIG. 5 is a flowchart illustrating a method for sending a beam failure request according to another embodiment. As illustrated in FIG. 5, the method further includes the following.

At block S4, the beam failure information is sent at least in the requested PUSCH resource.

In an embodiment, after the PUSCH resource is requested, the beam failure information may be sent at least in the requested PUSCH resource. The beam failure information may be sent to the base station in format of a medium access control element (MAC CE). The beam failure information may include an index of the secondary cell in which the beam failure occurs, and may further include an index of a new suitable beam if the new suitable beam is detected.

Figure 6:
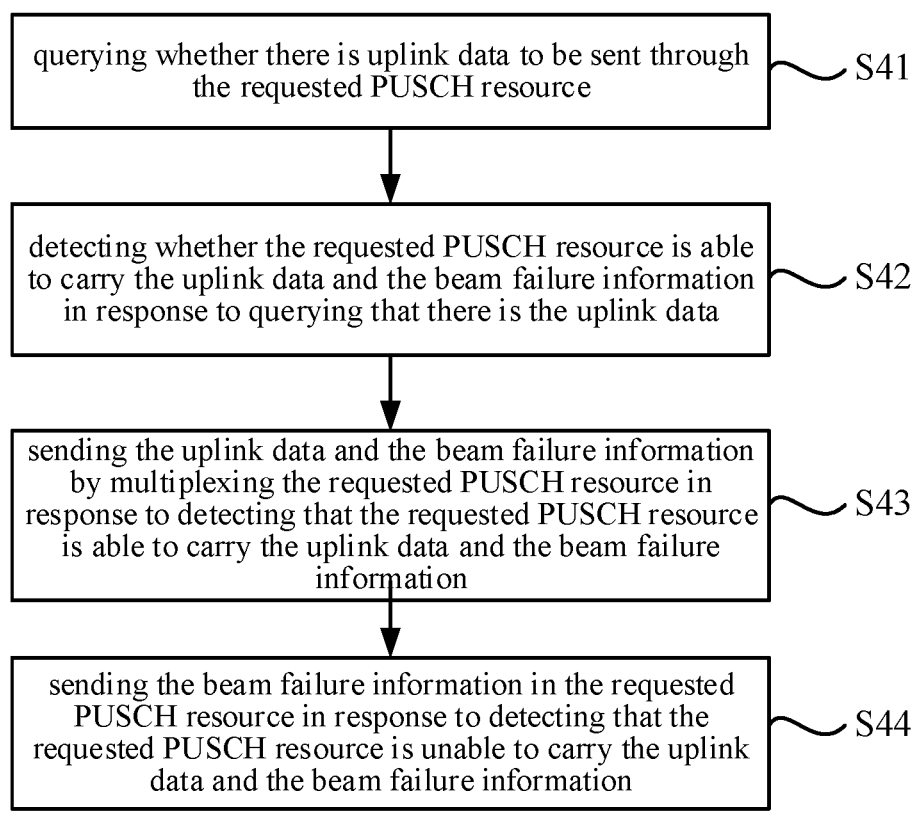
FIG. 6 is a flowchart illustrating a method for sending beam failure information at least in a requested PUSCH resource according to an embodiment.

FIG. 6 is a flowchart illustrating a method for sending beam failure information at least in a requested PUSCH resource according to an embodiment. As illustrated in FIG. 6, sending the beam failure information at least in the requested PUSCH resource may include the following.

At block S41, it is queried whether there is uplink data to be sent through the requested PUSCH resource.

At block S42, it is detected whether the requested PUSCH resource is able to carry the uplink data and the beam failure information in response to there being the uplink data.

At block 43, the uplink data and the beam failure information are sent by multiplexing the requested PUSCH resource in response to detecting that the requested PUSCH resource is able to carry the uplink data and the beam failure information.

At block S44, the beam failure information is sent in the requested PUSCH resource in response to detecting that the requested PUSCH resource is unable to carry the uplink data and the beam failure information.

In an embodiment, if the terminal queries that there is uplink data to be sent through the PUSCH resource (i.e., having the uplink data to be sent) when the beam failure information needs to be sent, it may be further detected a size of the requested PUSCH resource to determine whether the requested PUSCH resource can carry both the uplink data and the beam failure information. If the requested PUSCH resource can carry both the uplink data and the beam failure information, the uplink data and the beam failure information may be sent by multiplexing the requested PUSCH resource, so as to ensure that both the uplink data and the beam failure information can be sent to the base station timely. If the requested PUSCH resource cannot carry both the uplink data and the beam failure information, the beam failure information may be sent in the requested PUSCH resource, so as to at least ensure that the beam failure information can be sent to the base station, such that the beam failure recovery can be completed timely.

Alternatively, the another signaling may be at least one of:
a scheduling request, channel state information and a hybrid automatic repeat request.

Corresponding to the above embodiments of the method for sending a beam failure request, the disclosure further provides embodiments of an apparatus for sending a beam failure request.

Figure 7:
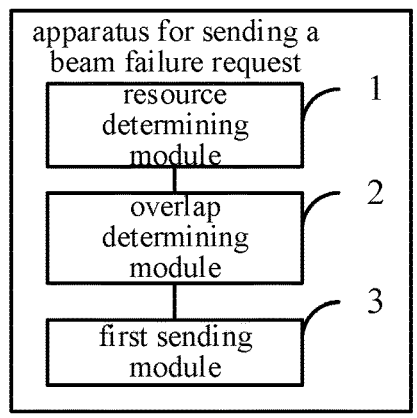
FIG. 7 is a block diagram illustrating an apparatus for sending a beam failure request according to an embodiment.

FIG. 7 is a block diagram illustrating an apparatus for sending a beam failure request according to an embodiment. The apparatus for sending a beam failure request described in this embodiment may be applied in a terminal. The terminal may be used as a user device to communicate with a base station, for example based on a 4G long term evolution (4G LTE) technology or based on a 5G new radio (5G NR) technology. The terminal includes but is not limited to a mobile phone, a tablet, a wearable device, a vehicle-mounted device or other electronic devices.

As illustrated in FIG. 7, the apparatus for sending a beam failure request may include a resource determining module 1, an overlap determining module 2 and a first sending module 3.

The resource determining module 1 is configured to determine a first resource for sending a beam failure request in a physical uplink control channel (PUCCH) in response to a beam failure occurring in a secondary cell of a server cell.

The overlap determining module 2 is configured to determine whether a second resource occupied by another signaling to be sent through the PUCCH is overlapped with the first resource.

The first sending module 3 is configured to send the beam failure request at least on the first resource in response to determining that the second resource is overlapped with the first resource.

Alternatively, the another signaling includes a scheduling request, and the beam failure request has a same indication format as the scheduling request.

Alternatively, the first resource and the second resource are completely overlapped, and the first resource and the second resource belong to a same resource set. The first sending module is configured to send the beam failure request on the first resource.

Alternatively, the first sending module is configured to send the beam failure request on the first resource and the scheduling request on the second resource in response to determining that the first resource is not overlapped with the second resource.

Alternatively, the another signaling includes a scheduling request, the beam failure request and the scheduling request occupy a same bit, and a bit indication codeword of the beam failure request is different from a bit indication codeword of the scheduling request.

Alternatively, the bit indication codeword of the another signaling and the beam failure request occupy one bit. The first sending module is configured to send the beam failure request on the first resource.

Alternatively, a bit number of bits supported by the PUCCH of the first resource is more than a bit number of bits occupied by the beam failure request. The first sending module is configured to send the beam failure request and the another signaling based on multiplexing.

Alternatively, the beam failure request occupies a plurality of bits, and a bit indication codeword of the plurality of bits of the beam failure request is configured to at least indicate:

the secondary cell in which the beam failure occurs.

Alternatively, the bit indication codeword of the plurality of bits of the beam failure request is further configured to indicate at least one of:

a number of secondary cells in which the beam failure occurs;

having uplink data to be sent; and a data amount of the uplink data to be sent.

Figure 8:
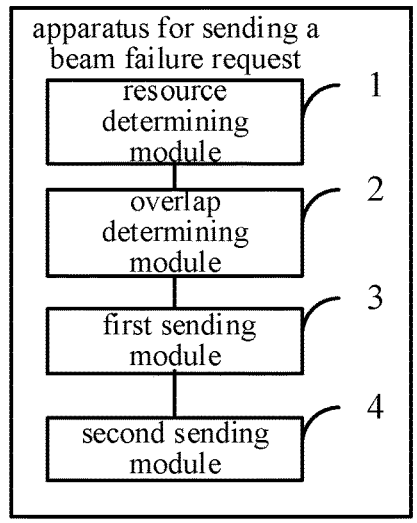
FIG. 8 is a block diagram illustrating an apparatus for sending a beam failure request according to another embodiment.

FIG. 8 is a block diagram illustrating an apparatus for sending a beam failure request according to another embodiment. As illustrated in FIG. 8, the apparatus further includes a second sending module 4.

The second sending module 4 is configured to send beam failure information at least in a requested physical uplink shared channel (PUSCH) resource.

Figure 9:
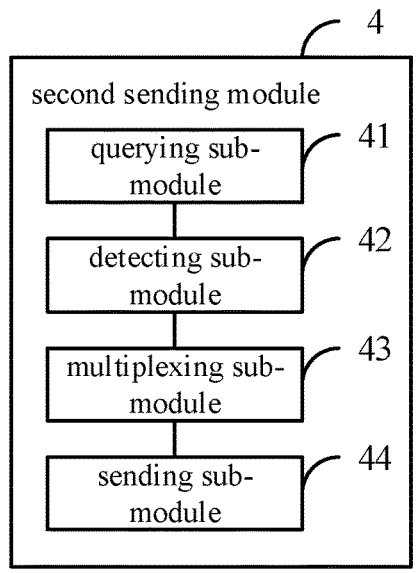
FIG. 9 is a block diagram illustrating a second sending module according to an embodiment.

FIG. 9 is a block diagram illustrating a second sending module according to an embodiment. As illustrated in FIG. 9, the second sending module further includes a querying sub-module 41, a detecting sub-module 42, a multiplexing sub-module 43 and a sending sub-module 44.

The querying sub-module 41 is configured to query whether there is uplink data to be sent through the requested PUSCH resource.

The detecting sub-module 42 is configured to detect whether the requested PUSCH resource is able to carry the uplink data and the beam failure information in response to there being the uplink data.

The multiplexing sub-module 43 is configured to send the uplink data and the beam failure information by multiplexing the requested PUSCH resource in response to detecting that the requested PUSCH resource is able to carry the uplink data and the beam failure information The sending sub-module 44 is configured to send the beam failure information in the requested PUSCH resource in response to detecting that the requested PUSCH resource is unable to carry the uplink data and the beam failure information.

Alternatively, the another signaling includes at least one of:

a scheduling request, channel state information and a hybrid automatic repeat request.

Regarding the apparatus in the above-mentioned embodiment, the specific manner in which each module performs the operation has been described in detail in the embodiment of the related method, and will not be described in detail here.

As for the apparatus embodiments, since they basically correspond to the method embodiments, reference may be made to the partial descriptions of the method embodiments for relevant parts. The apparatus embodiments described above are only illustrative, the modules described as separate components may or may not be physically separated, and the components displayed as modules may or may not be physical modules, that is, they may be located in one place, or can be distributed over multiple network modules. Some or all of the modules may be selected according to actual needs to achieve the purpose of the solution in the embodiment. Those of ordinary skill in the art can understand and implement the technical solution without making creative efforts.

The disclosure further provides an electronic device. The electronic device includes:

a processor; and a memory storing instructions executable by the processor.

The processor is configured to perform the method according to any of the above embodiments of the disclosure.

Figure 10:
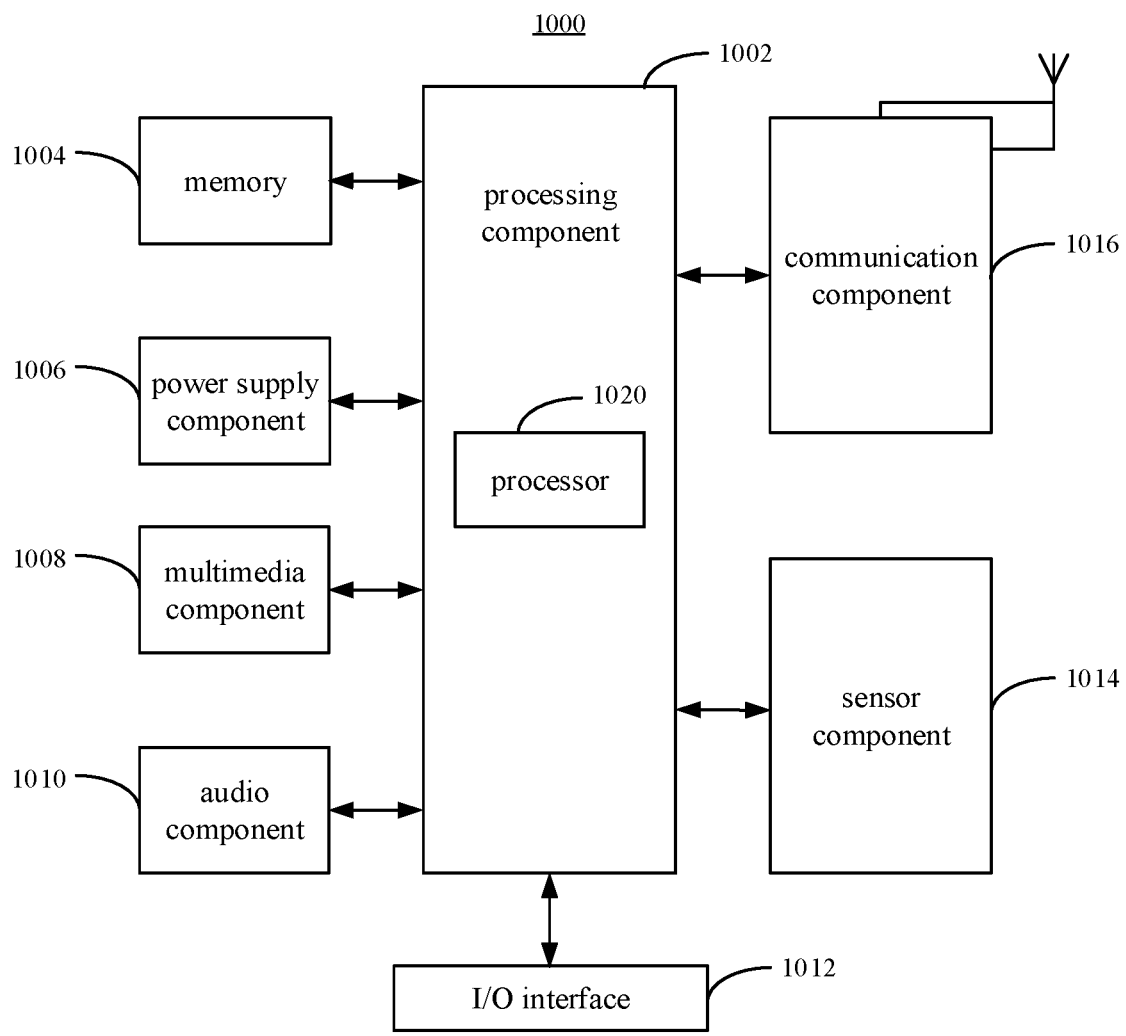
FIG. 10 is a block diagram illustrating an apparatus suitable for sending a beam failure request according to an embodiment.

FIG. 10 is a block diagram illustrating an apparatus 1000 suitable for sending a beam failure request according to an embodiment. For example, the apparatus 1000 may be a mobile phone, a computer, a digital broadcasting terminal, a messaging device, a game console, a tablet device, a medical equipment, a fitness equipment, a personal digital assistant, and so on.

Referring to FIG. 10, the apparatus 1000 may include one or more components of the followings: a processing component 1002, a memory 1004, a power supply component 1006, a multimedia component 1008, an audio component 1010, an input/output (I/O) interface 1012, a sensor component 1014, and a communication component 1016.

The processing component 1002 generally controls the whole operation of the apparatus 1000, such as the operations related to display, phone call, data communication, camera operation and recording operation. The processing component 1002 may include one or more processors 1020 to perform instructions, to complete all or part of blocks of the above method. In addition, the processing component 1002 may include one or more modules for the convenience of interaction between the processing component 1002 and other components. For example, the processing component 1002 may include a multimedia module for the convenience of interaction between the multimedia component 1008 and the processing component 1002.

The memory 1004 is configured to store all types of data to support the operation of the apparatus 1000. Examples of the data include the instructions of any applications or methods operated on the apparatus 1000, contact data, phone book data, messages, pictures, videos, etc. The memory 1004 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 1006 may provide power for all components of the apparatus 1000. The power supply component 1006 may include a power supply management system, one or more power supplies, and other units related to generating, managing and distributing power for the apparatus 1000.

The multimedia component 1008 includes an output interface screen provided between the apparatus 1000 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 1008 includes a front camera and/or a rear camera. When the apparatus 1000 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 1010 is configured to output and/or input an audio signal. For example, the audio component 1010 includes a microphone (MIC). When the apparatus 1000 is in an operation mode, such as a call mode, a record mode, and a speech recognition mode, the microphone is configured to receive the external audio signal. The received audio signal may be further stored in the memory 1004 or sent via the communication component 1016. In some embodiments, the audio component 1010 further includes a speaker configured to output an audio signal.

The I/O interface 1012 provides an interface for the processing component 1002 and the peripheral interface module, and the peripheral interface module may be a keyboard, a click wheel, a button, etc. The button may include but not limited to a home button, a volume button, a start button and a lock button.

The sensor component 1014 includes one or more sensors, configured to provide various aspects of status assessment for the apparatus 1000. For example, the sensor component 1014 may detect the on/off state of the apparatus 1000 and the relative positioning of the component. For example, the component is a display and a keypad of the apparatus 1000. The sensor component 1014 may further detect the location change of the apparatus 1000 or one component of the apparatus 1000, the presence or absence of contact between the user and the apparatus 1000, the orientation or acceleration/deceleration of the apparatus 1000, and the temperature change of the apparatus 1000. The sensor component 1014 may include a proximity sensor configured to detect the existence of the objects nearby without any physical contact. The sensor component 1014 may further include a light sensor such as CMOS or CCD image sensor, which is configured to use in imaging applications. In some embodiments, the sensor component 1014 may further include an acceleration transducer, a gyroscope sensor, a magnetic sensor, a pressure sensor or a temperature sensor.

The communication component 1016 is configured for the convenience of wire or wireless communication between the apparatus 1000 and other devices. The apparatus 1000 may access wireless networks based on communication standard, such as WiFi, 2G or 3G, 4G LTE, 5G NR or their combination. In an embodiment, the communication component 1016 receives broadcast signals or broadcast-related information from an external broadcast management system via a broadcast channel. In an embodiment, the communication component 1016 further includes a near field communication (NFC) module to facilitate short-range communication. For example, the NFC module may be achieved based on an RFID technology, an IrDA technology, a UWB technology, a BT technology and other technologies.

In an embodiment, the apparatus 1000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 1004 including instructions, the instructions may be executed by the processor 1020 of the apparatus 1000 to complete the above methods. For example, the non-transitory computer-readable storage medium may be a ROM, a random access memory (RAM), a CD-ROM, a magnetic tape, a floppy disk, an optical data storage device, etc.

After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

It should be noted that, in the disclosure, relational terms such as first and second are only used to distinguish one entity or operation from another entity or operation, and do not necessarily require or imply any actual relationship or sequence existing between these entities or operations. The terms "comprise", "comprising" or any other variation thereof are intended to encompass non-exclusive inclusion, such that a process, method, article or device comprising a list of elements includes not only those elements, but also other not expressly listed elements, or also include elements inherent to such a process, method, article or device. Without further limitation, an element defined by the phrase "comprising a . . . " does not preclude the presence of additional identical elements in a process, method, article or apparatus that includes the element.

The methods and devices provided by the embodiments of the present disclosure have been described in detail above, and specific examples are used to illustrate the principles and implementations of the disclosure. At the same time, for those of ordinary skill in the art, according to the idea of the present disclosure, there will be changes in the specific implementation and application scope. In summary, the content of this specification should not be construed as a limitation to the disclosure.

The invention claimed is:

1. A method for sending a beam failure request, comprising:
 determining, by a terminal, a first resource for sending a beam failure request in a physical uplink control channel (PUCCH) in response to a beam failure occurring in a secondary cell of a server cell;
 determining, by the terminal, whether a second resource occupied by a signaling to be sent through the PUCCH is overlapped with the first resource; and
 sending, by the terminal, the beam failure request at least on the first resource in response to determining that the second resource is overlapped with the first resource,
 wherein a bit number of bits supported by the PUCCH of the first resource is more than a bit number of bits occupied by the beam failure request, and
 wherein sending the beam failure request at least on the first resource comprises:
 sending the beam failure request and the signaling based on multiplexing.

2. The method of claim 1, wherein the signaling comprises a scheduling request, and the beam failure request has a same indication format as the scheduling request.

3. The method of claim 2, wherein the first resource and the second resource are completely overlapped, and the first resource and the second resource belong to a same resource set;
 wherein sending the beam failure request at least on the first resource comprises:
 sending the beam failure request on the first resource.

4. The method of claim 2, further comprising:
 sending the beam failure request on the first resource and the scheduling request on the second resource in response to determining that the first resource is not overlapped with the second resource.

5. The method of claim 1, wherein the signaling comprises a scheduling request, the beam failure request and the scheduling request occupy a same bit, and a bit indication codeword of the beam failure request is different from a bit indication codeword of the scheduling request.

6. The method of claim 1, wherein the beam failure request occupies a plurality of bits, and a bit indication codeword of the plurality of bits of the beam failure request is configured to at least indicate:
 the secondary cell in which the beam failure occurs.

7. The method of claim 6, wherein the bit indication codeword of the plurality of bits of the beam failure request is further configured to indicate at least one of:
 a number of secondary cells in which the beam failure occurs;
 having uplink data to be sent; and
 a data amount of the uplink data to be sent.

8. The method of claim 1, further comprising:
 sending beam failure information at least in a requested physical uplink shared channel (PUSCH) resource.

9. The method of claim 8, wherein sending the beam failure information at least in the requested PUSCH resource comprises:
 querying whether uplink data exists to be sent through the requested PUSCH resource;
 detecting whether the requested PUSCH resource is able to carry the uplink data and the beam failure information in response to determining that the uplink data exists;
 sending the uplink data and the beam failure information by multiplexing the requested PUSCH resource in response to detecting that the requested PUSCH resource is able to carry the uplink data and the beam failure information; and
 sending the beam failure information in the requested PUSCH resource in response to detecting that the requested PUSCH resource is unable to carry the uplink data and the beam failure information.

10. The method of claim 1, wherein the signaling comprises at least one of:
 a scheduling request;
 channel state information; or
 a hybrid automatic repeat request.

11. An electronic device, comprising:
 a processor;
 a memory storing instructions executable by the processor;
 wherein, the processor is configured to perform a method for sending a beam failure request, comprising:
 determining a first resource for sending a beam failure request in a physical uplink control channel (PUCCH) in response to a beam failure occurring in a secondary cell of a server cell;
 determining whether a second resource occupied by a signaling to be sent through the PUCCH is overlapped with the first resource; and
 sending the beam failure request at least on the first resource in response to determining that the second resource is overlapped with the first resource,
 wherein a bit number of bits supported by the PUCCH of the first resource is more than a bit number of bits occupied by the beam failure request, and
 wherein sending the beam failure request at least on the first resource comprises:
 sending the beam failure request and the signaling based on multiplexing.

12. The electronic device of claim 11, wherein the signaling comprises a scheduling request, and the beam failure request has a same indication format as the scheduling request.

13. The electronic device of claim 12, wherein the first resource and the second resource are completely overlapped, and the first resource and the second resource belong to a same resource set;
wherein sending the beam failure request at least on the first resource comprises:
sending the beam failure request on the first resource.

14. The electronic device of claim 12, wherein the processor is further configured to perform:
sending the beam failure request on the first resource and the scheduling request on the second resource in response to determining that the first resource is not overlapped with the second resource.

15. The electronic device of claim 11, wherein the signaling comprises a scheduling request, the beam failure request and the scheduling request occupy a same bit, and a bit indication codeword of the beam failure request is different from a bit indication codeword of the scheduling request.

16. The electronic device of claim 11, wherein the processor is further configured to perform:
sending beam failure information at least in a requested physical uplink shared channel (PUSCH) resource.

17. The electronic device of claim 16, wherein sending the beam failure information at least in the requested PUSCH resource comprises:
querying whether uplink data exists to be sent through the requested PUSCH resource;
detecting whether the requested PUSCH resource is able to carry the uplink data and the beam failure information in response to determining that the uplink data exists;
sending the uplink data and the beam failure information by multiplexing the requested PUSCH resource in response to detecting that the requested PUSCH resource is able to carry the uplink data and the beam failure information; and
sending the beam failure information in the requested PUSCH resource in response to detecting that the requested PUSCH resource is unable to carry the uplink data and the beam failure information.

18. A non-transitory computer-readable storage medium stored with executable instructions thereon, wherein the executable instructions are loaded and executed by a processor in a terminal, to perform a method for sending a beam failure request, comprising:
determining a first resource for sending a beam failure request in a physical uplink control channel (PUCCH) in response to a beam failure occurring in a secondary cell of a server cell;
determining whether a second resource occupied by signaling to be sent through the PUCCH is overlapped with the first resource; and
sending the beam failure request at least on the first resource in response to determining that the second resource is overlapped with the first resource,
wherein a bit number of bits supported by the PUCCH of the first resource is more than a bit number of bits occupied by the beam failure request, and
wherein sending the beam failure request at least on the first resource comprises:
sending the beam failure request and the signaling based on multiplexing.

* * * * *